(12) United States Patent
Wolff et al.

(10) Patent No.: US 9,227,515 B2
(45) Date of Patent: Jan. 5, 2016

(54) SYSTEM AND METHOD FOR CONTROLLING A VEHICLE

(71) Applicant: General Electric Company, Schenectady, NY (US)

(72) Inventors: Jeffrey Wolff, Erie, PA (US); Henry Todd Young, Erie, PA (US); Timothy Brown, Erie, PA (US); Mark Carter, Karratha (AU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/464,226

(22) Filed: Oct. 14, 2014

(65) Prior Publication Data

US 2015/0081150 A1    Mar. 19, 2015

Related U.S. Application Data

(63) Continuation of application No. PCT/US2014/051840, filed on Aug. 20, 2014.

(60) Provisional application No. 61/867,780, filed on Aug. 20, 2013.

(51) Int. Cl.

| | |
|---|---|
| *B60L 11/08* | (2006.01) |
| *B60L 15/20* | (2006.01) |
| *B60L 15/00* | (2006.01) |
| *E02F 9/20* | (2006.01) |
| *E02F 9/22* | (2006.01) |

(52) U.S. Cl.
CPC ............. *B60L 11/08* (2013.01); *B60L 15/007* (2013.01); *B60L 15/2018* (2013.01); *B60L 2200/40* (2013.01); *B60L 2210/20* (2013.01); *E02F 9/2075* (2013.01); *E02F 9/2079* (2013.01); *E02F 9/2253* (2013.01); *Y10S 903/902* (2013.01)

(58) Field of Classification Search
CPC ..... E02F 9/2075; E02F 9/2079; E02F 9/2253; B60L 11/08; B60L 15/007; B60L 15/2018; B60L 2210/20; B60L 2200/40; Y10S 903/902
See application file for complete search history.

(56) References Cited

U.S. PATENT DOCUMENTS

| | | | |
|---|---|---|---|
| 5,376,869 A | 12/1994 | Konrad | |
| 6,364,434 B1 * | 4/2002 | Sway-Tin et al. | ............. 303/152 |
| 6,456,909 B1 | 9/2002 | Shimada et al. | |

(Continued)

FOREIGN PATENT DOCUMENTS

| | | | |
|---|---|---|---|
| KR | 20100032485 A | * | 3/2010 |

OTHER PUBLICATIONS

PCT Search Report and Written Opinion issued in connection with corresponding Application No. PCT/US2014/051840 on Dec. 5, 2014.

*Primary Examiner* — Mary Cheung
*Assistant Examiner* — Rodney Butler
(74) *Attorney, Agent, or Firm* — GE Global Patent Operation; John A. Kramer

(57) ABSTRACT

A control system for a vehicle comprises a control unit configured to be electrically coupled to a drive system of the vehicle. The drive system includes at least one traction motor for providing motive power to the vehicle. The control unit is configured to control a torque output of the traction motor to hold zero speed or near zero speed of the vehicle on a grade without knowing information, in at least one mode of operation, about the grade and/or a load of the vehicle, and without a service brake of the vehicle being activated.

19 Claims, 4 Drawing Sheets

(56) References Cited

U.S. PATENT DOCUMENTS

| | | |
|---|---|---|
| 7,698,044 B2 | 4/2010 | Prakash et al. |
| 7,926,889 B2 | 4/2011 | Bell, Jr. et al. |
| 2003/0085576 A1* | 5/2003 | Kuang et al. ................ 290/40 C |
| 2005/0057090 A1 | 3/2005 | Kinser et al. |
| 2006/0086547 A1 | 4/2006 | Shimada et al. |
| 2009/0218966 A1* | 9/2009 | Shimada et al. .............. 318/380 |
| 2009/0255746 A1* | 10/2009 | Boesch ......................... 180/197 |
| 2012/0197473 A1 | 8/2012 | Kshatriya |
| 2013/0296105 A1* | 11/2013 | Grutter et al. ..................... 477/5 |
| 2013/0297106 A1* | 11/2013 | Yamazaki et al. .............. 701/22 |
| 2015/0081150 A1* | 3/2015 | Wolff et al. ..................... 701/22 |

\* cited by examiner

SYSTEM AND METHOD FOR CONTROLLING A VEHICLE

CROSS-REFERENCE TO RELATTED APPLICATION

This application is a continuation of International Application No. PCT/US14/51840, filed Aug. 20, 2014, which claims priority to U.S. Provisional Application No. 61/867,780, filed Aug. 20, 2013, which is hereby incorporated by reference.

FIELD OF THE INVENTION

Embodiments of the invention relate generally to vehicle control. Other embodiments relate to controlling a vehicle on grade.

BACKGROUND OF THE INVENTION

Large off-highway vehicles ("OHVs"), such as mining vehicles used to haul heavy payloads excavated from open pit mines, are well known and typically employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high-torque, low-speed rotational energy output which is supplied to the rear wheels.

Typical operating loads in an OHV may exceed one hundred tons, while the gross weight of the vehicle and load may be several hundred tons. Operating these vehicles on grade, therefore, can present several challenges, especially for inexperienced operators. Accordingly, it may be desirable to provide a system and method for controlling a vehicle that differ from existing systems and methods.

BRIEF DESCRIPTION OF THE INVENTION

In an embodiment of the invention, a system (e.g., a control system for a vehicle) comprises a control unit configured to be electrically coupled to a drive system of the vehicle. The drive system includes at least one traction motor for providing motive power to the vehicle. The control unit is configured to control a torque output of the traction motor to hold zero speed or near zero speed of the vehicle on a grade without knowing information, in at least one mode of operation, about the grade and/or a load of the vehicle.

In another embodiment, a method for controlling a vehicle comprises electrically powering a drive system of the vehicle for vehicle propulsion. The drive system includes at least one traction motor. The method further comprises, with a control unit of the vehicle, controlling a torque output of the at least one traction motor to hold zero speed or near zero speed of the vehicle on a grade without knowing information, in at least one mode of operation, about at least one of the grade or a load of the vehicle.

In another embodiment, a system (e.g., a control system for a vehicle) comprises a control unit configured to be electrically coupled to a drive system of the vehicle. The drive system includes at least one traction motor for providing motive power to the vehicle. The control unit is configured to determine a calculated deceleration of the vehicle, and to control a torque output of at least one traction motor of the vehicle, based at least in part on the calculated deceleration, to a target deceleration of the vehicle to a selected speed, without applying a service brake of the vehicle.

In another embodiment, a method for controlling a vehicle on grade comprises determining, with a control unit on-board the vehicle, a calculated deceleration of the vehicle. The method further comprises, with the control unit, controlling a torque output of at least one traction motor of the vehicle, based at least in part on the calculated deceleration, to a target deceleration of the vehicle to a selected speed, without applying a service brake of the vehicle.

In another embodiment, a vehicle includes a power system, a control unit, and at least one traction motor. The power system is configured to convert received electrical power to electrical signals for powering the at least one traction motor. (The vehicle may be configured for the electrical power to be received from an off-board source, an on-board energy storage device, or an on-board engine-alternator system.) The control unit is configured to control a torque output of the traction motor to hold zero speed or near zero speed of the vehicle on a grade without knowing information, in at least one mode of operation, about the grade and/or a load of the vehicle. For example, the control unit may be configured to electrically communicate a torque request signal to the power system to control the torque output of the at least one traction motor. Additionally or alternatively, the control unit may be configured to determine a calculated deceleration of the vehicle, and to electrically communicate the torque request signal to the power system to control the torque output of the at least one traction motor, based at least in part on the calculated deceleration, to a target deceleration of the vehicle to a selected speed, without applying a service brake of the vehicle.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1A:
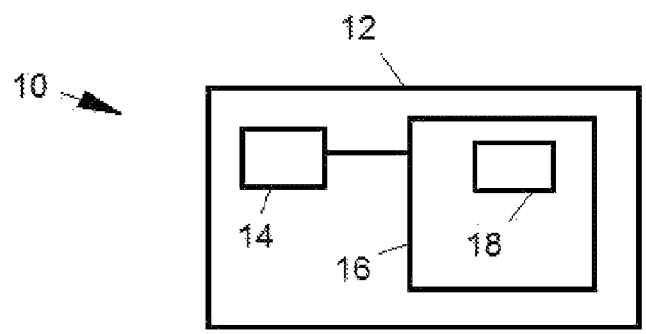
FIG. 1A is a schematic view of a control system according to an embodiment of the invention.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to haul trucks having a diesel engine that are utilized in the surface mining industry, embodiments of the invention are also applicable for use with internal combustion engines and vehicles employing such engines, generally. For example, the vehicles may be off-highway vehicles ("OHVs") designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, etc. As used herein, "electrical communication" or "electrically coupled" means that certain components are configured to communicate with one another through direct or indirect signaling by way of direct or indirect electrical connections. As also used herein, "zero speed" refers to a condition of a vehicle when it is stopped/static. "Near zero" speed means very-nearly stopped (e.g., in an embodiment, traveling no more than 5 mph/8 kph, or in another embodiment, traveling no more than 1 mph/1.6 kph).

Embodiments of the invention relate to control systems (and related methods) for controlling a vehicle, which provides for rapid acceleration from a standstill or near standstill while on grade, and which prevents the vehicle from rolling backwards on grade without the need for a service brake application. ("Grade" refers to a non-flat surface having an incline of greater or less than zero degrees. "Service brake" refers to a mechanical friction brake, e.g., typically of the type where a brake pad is actuated with an air/pneumatic or hydraulic system to engage a rotor or disc that is connected to a wheel or axle, and which is typically separate from the propulsion system.)

Figure 1B:
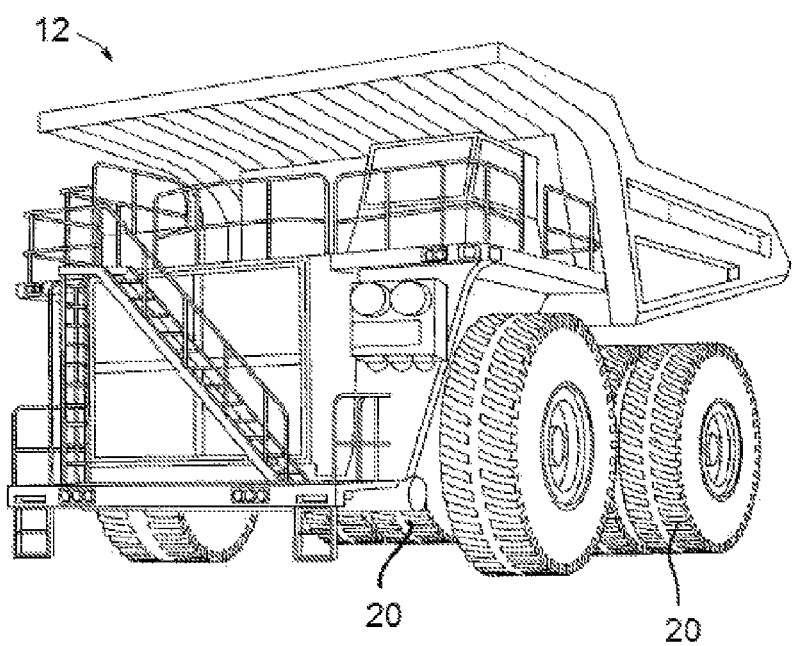
FIGS. 1B and 1C are perspective and side elevation views, respectively, of vehicles outfitted with the control system.
Figure 1C:
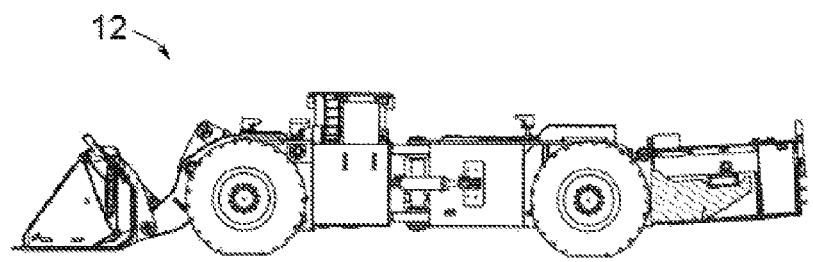

FIG. 1A illustrates an embodiment of the control system 10 for a vehicle 12. The control system 10 comprises a control unit 14 configured to be electrically coupled to a drive system 16 of the vehicle. The drive system 16 includes at least one traction motor 18 for providing motive power to the vehicle. (Traction motors are electric motors configured for use in moving a vehicle.) With reference to FIG. 1B, the vehicle 12 may be a haul truck. The haul truck is a dump truck specifically engineered for use in high production mining and heavy-duty construction environments. The drive system 16 of the haul truck includes drive wheels 20 coupled to a diesel-electric power/traction system 100 which provides motive power to the haul truck. With reference to FIG. 1C, as another example, the vehicle 12 may be an underground mining vehicle, such as the illustrated load-haul-dump vehicle. (The haul truck and underground mining vehicles are illustrative of vehicles generally, although in embodiments, a system and/or method of the invention is implemented on a haul truck or an underground mining vehicle specifically.)

Figure 2A:
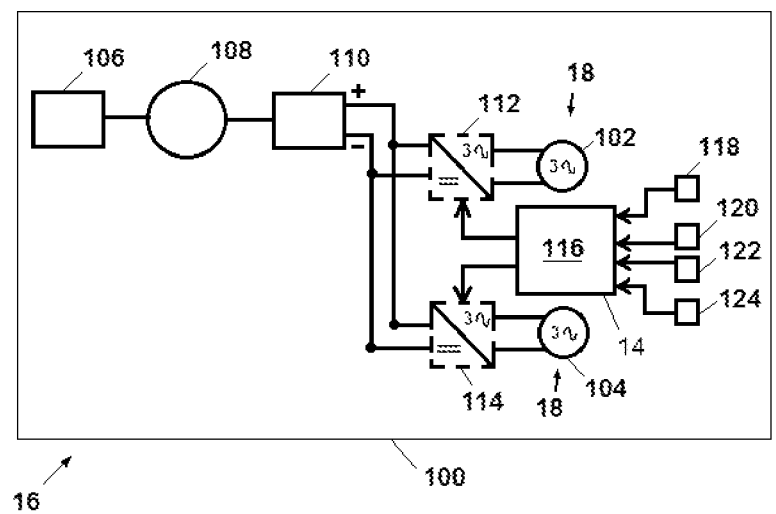
FIG. 2A is a schematic diagram of a power/traction system of a vehicle, according to an embodiment.

FIG. 2A shows an embodiment of the power/traction system 100. As indicated above, the haul truck has at least two drive wheels 20. Each wheel 20 is driven by a three-phase alternating-current (AC), induction type wheel motor 18. The wheel motors 18 are referenced as a first wheel motor 102 and a second wheel motor 104. Electrical power is supplied by a diesel engine 106 driving a three-phase AC generator/alternator 108. In other embodiments, other types of mechanical engines may be utilized. The diesel engine 106 and generator 108 are housed within the haul truck 12. The AC output of the generator 108 is fed into one or more rectifiers 110. The direct current (DC) output of the rectifiers 110 is fed into one or more power converters, e.g., first and second inverter systems 112, 114. (Each inverter system 112, 114 includes one or more inverters.) The first inverter system 112 supplies three-phase, variable frequency AC power to the first wheel motor 102. Similarly, the second inverter system 114 supplies three-phase AC power to the second wheel motor 104.

As further shown in FIG. 2A, the power/traction system 100 includes a control unit 116 electrically coupled to the one or more power converters (e.g., the inverter systems 112, 114), which, among other tasks, is configured to determine and send a desired torque request signal to the inverter systems 112, 114. The torque request signal is processed by the control unit for the inverter systems 112, 114 to drive the motors 18 (e.g., wheel motors 102, 104) to the desired torque output magnitude, and in the desired rotational direction corresponding to the intended direction of vehicle movement. The control unit 116 includes one or more processors/microprocessors operating according to a set of stored instructions to provide for vehicle control, as discussed in detail herein.

As would be readily understood by one of ordinary skill in the art, the control unit 116 may be configured to receive inputs from an ignition switch 118, an accelerator position transducer 120 (associated with an operator accelerator control, e.g., "gas pedal"), a brake position transducer 122, and/or a gear selector 124 for operating the electric motors 102, 104 for driving and braking the vehicle 12. The gear selector 124 provides a means for permitting an operator to select an intended or desired direction of vehicle movement, such as forward movement or reverse movement.

As discussed above, the inverter systems 112, 114 convert DC voltage to variable frequency AC for driving the induction-type AC motors 102, 104. Current and speed feedback is utilized by the inverter systems 112, 114 for closed loop control when speed is above a certain rpm, as well as open loop frequency-type control below a certain rpm.

The control unit 116 may be configured to operate as the control unit 14 of the control system 10. Thus, in an embodiment, the control unit 116 is configured to calculate or otherwise determine vehicle deceleration and to actively manage to a target deceleration, to either zero speed or selectable near zero speed, as an operator lets off of the accelerator pedal. This allows the vehicle 10 to hold zero speed or near zero speed on grade without knowing information about grade and/or load, and prevents the vehicle 12 from rolling backwards on grade, without the need for a service brake application. This also assures that when the vehicle 12 is in forward or reverse, that the direction of travel is actively maintained in that direction by the control system. As used herein "actively manage" means operating the vehicle in response to, or in dependence on, varying control inputs (e.g., control loop inputs) over an interval of time. For example, the control unit 14 may be configured to vary the torque output of the traction motors, over an interval of time, in dependence upon a calculated deceleration of the vehicle (which varies over time) to achieve a target deceleration of the vehicle.

Figure 2B:
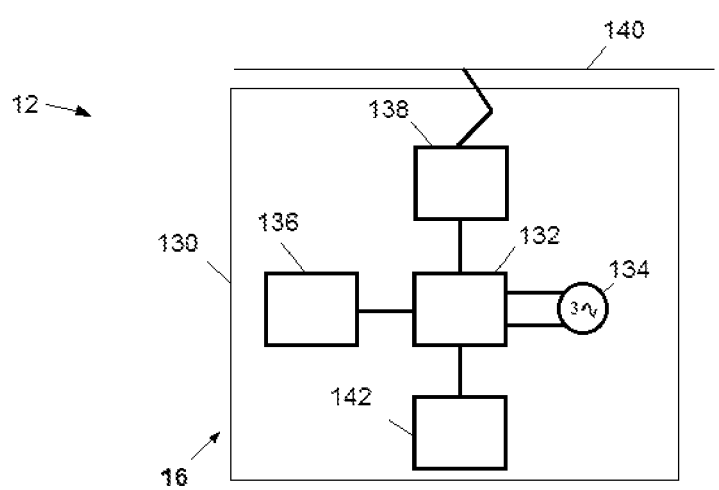
FIG. 2B is a schematic diagram of a power/traction system of a vehicle, according to another embodiment.

FIG. 2B shows another embodiment of a power/traction system 130 of a vehicle 12, which is outfitted with the control system 10. The power/traction system 130 includes a power system 132, at least one traction motor 134, and one or more of: an on-board energy storage device 136; and/or an off-board power coupling device 138. The energy storage device 136 may be a battery and/or an ultra-capacitor (for example), and is configured to store electrical energy sufficient for powering the at least one traction motor 134 for vehicle movement/traction. The off-board power coupling device 138 is a pantograph, electric trolley system, or other device for selectively movably electrically connecting the vehicle to a catenary, third rail, or other off-board electrical conductor 140 that is configured to provide electricity to the vehicle for movement/traction, and/or for charging the energy storage device 136, and/or possibly other functions in addition. ("Off-board" power coupling device means a device for selectively/controllably coupling a vehicle with an off-board electrical power source, such that the vehicle can still move for its intended function(s), and not that the device is off-board the vehicle.) The power system 132 is configured to convert power received from the off-board electrical conductor and/or from the energy storage device to electrical signals for powering the at least one traction motor 134. The vehicle also includes a control unit 142 electrically coupled to the power system 132. The control unit 142 is configured as per the control units 14, 116 described elsewhere herein. (For example, the control unit 142 may be configured to control a torque output of the traction motor to hold zero speed or near zero speed of the vehicle on a grade without knowing information, in at least one mode of operation, about the grade and/or a load of the vehicle. For doing so, the control unit may be configured to electrically communicate a torque request signal to the power system to control the torque output of the at least one traction motor.) In another embodiment, the power/traction system 130 also includes an auxiliary power unit (APU), fuel cell, internal combustion engine, or the like, for generating electricity to charge the energy storage device 136, or for other purposes.

Figure 3:
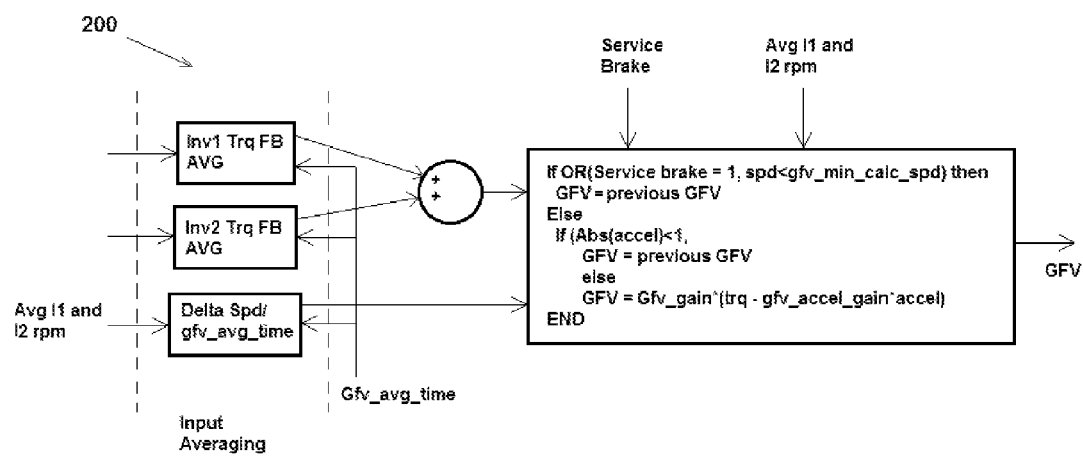
FIG. 3 is a diagram illustrating an exemplary gravity force value calculation function according to an embodiment of the invention.

FIG. 3 shows an exemplary gravity force valuation calculation function 200 utilized by the control system 10/control unit 14. Utilizing this function as the vehicle 12 is traveling on grade, the control system performs a real-time calculation of a value to represent gravity force (GFV) over a predetermined time interval (gfv_avg_time). GFV is a lump representation of vehicle weight and the grade that the vehicle is operating on. Notably, GFV does not change below a configurable minimum vehicle speed (gfv_min_calc_spd). As shown therein, the inputs of the function are as follows:

gfv_min_calc_spd: minimum speed that the gravity force value function will calculate new values.
Gfv_avg_time: time interval for GFV to be calculated over.
Gfv_gain: allows for the adjustable increase of gravity force value authority.
Gfv_accel_gain: allows for the adjustment of acceleration impact on GFV.

As indicated above, the output of the function is gravity force value, GFV.

In connection with the determination of a GFV value utilizing the function illustrated in FIG. 3, the following GFV equation derivation is provided. In particular, to determine a torque that is required to result in a specific acceleration, the control unit 14 is configured to calculate the following:

$$\text{Torque required} = \text{Current Torque} - \text{Gravity Force} \times \Delta\text{Acceleration} \quad (1)$$

$$F\text{net} = \text{Mass} \times \text{Acceleration} \quad (2)$$

$$TE - \text{Gravity Force} = \text{Mass} \times \text{Acceleration} \quad (3)$$

$$\text{Therefore, } TE - \text{Mass} \times \text{Acceleration} = \text{Gravity Force Value} \quad (4)$$

In an embodiment, mass can be made a fixed value, and let acceleration and TE develop a Gravity Force Value. GFV gain can then be utilized to scale down and make Gravity Force Value a gain to reflect how heavy the load and the grade the vehicle is traveling on. As illustrated, torque is utilized in place of TE.

Figure 4:
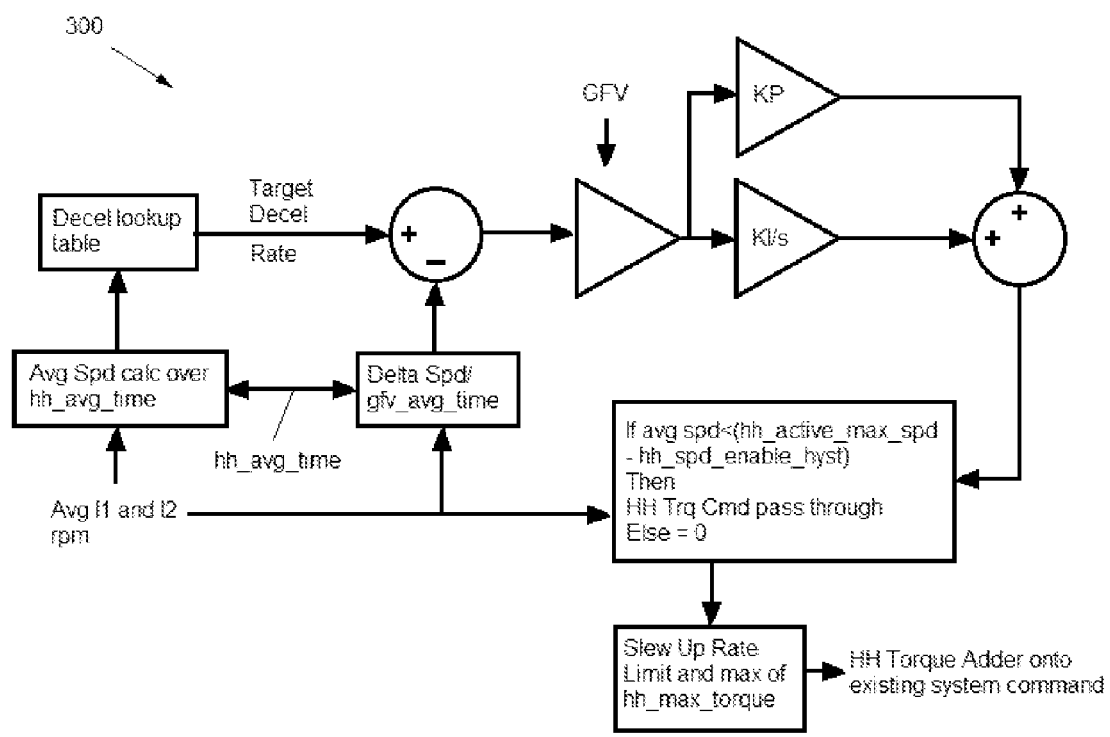
FIG. 4 is a diagram illustrating a hill hold control loop for determining a torque required to hold a vehicle on grade, according to an embodiment of the invention.

Turning now to FIG. 4, a diagram illustrating a hill hold control loop 300 for determining a torque required to hold a vehicle on grade, is shown. As illustrated therein, the hill hold control loop inputs are as follows:

Hh_active_max_spd: rpm speed where hill hold deceleration control loop torque value is no longer flowed to torque command.
Hh_spd_enablehyst: rpm hysteresis speed delta for enabling and disabling hill hold torque flow through.
Hh_decel_zero_spd: motor rpm speed that deceleration target is completely ramped to zero.
Hh_decel_ramp_spd: rpm speed that deceleration begins to linearly ramp from Crusieswhhdecel value to 0.
Hh_kp_gain: proportional gain for hill hold control loop.
Hh_ki_gain: integral gain for hill hold control loop.
Hh_max_torque: maximum torque authority hill hold loop can assert to hold truck on grade. This can be set to the max torque that would result from max grade that the vehicle is designed to hold on.
Hh_output_slew_up: slew up rate limit for torque output.
hh_avg_time: time interval for hill hold inputs to be calculated over.

In an embodiment, below the Hh_active_max_spd minus Hh_spd_enable_hyst speed, the hill hold control loop will be automatically enabled to add to the system motor torque command, up to a maximum of Hh_max_torque, to actively control vehicle deceleration to a target vehicle deceleration while the hill hold is active (Cruise_swhh_decel) (i.e., rpm/s). Below Hh_decelramp_spd, the target deceleration is linearly ramped to target 0, which results in the vehicle being held on grade at zero speed.

As should be appreciated, "hill hold" refers to control on a grade, and not necessarily on a hill.

In an embodiment, the control system 10, by utilizing the functions hereinbefore described, is configured to calculate vehicle deceleration and actively manage to a target deceleration to either zero speed, or a selectable near zero speed as the operator of the vehicle lets off of the accelerator pedal. This prevents the vehicle from rolling backwards on grade without the need for a service brake application, and ensures that when the vehicle is in the forward or reverse, that direction of travel is actively maintained in that direction. By managing to a target deceleration to zero or near zero speed, the control system 10 ensures that torque is present during the stop, which allows for rapid acceleration when a request for forward or reverse movement is given by an operator. As a result, vehicles employing the control system of the present invention are more user friendly and require less skill to operate.

In an embodiment, a system (e.g., a control system for a vehicle) comprises a control unit configured to be electrically coupled to a drive system of the vehicle. The drive system includes at least one traction motor for providing motive power to the vehicle. The control unit is configured to control (e.g., automatically control) a torque output of the at least one traction motor to hold zero speed or near zero speed of the vehicle on a grade without knowing information, in at least one mode of operation, about the grade and/or a load of the vehicle. Thus, in one embodiment, the control unit is configured to control the torque output of the traction motor to hold zero speed or near zero speed of the vehicle on the grade without knowing information about the grade. In another embodiment, the control unit is configured to control the torque output of the traction motor to hold zero speed or near zero speed of the vehicle on the grade without knowing information about the load of the vehicle. In another embodiment, the control unit is configured to control the torque output of the traction motor to hold zero speed or near zero speed of the vehicle on the grade both without knowing information about the grade and without knowing information about the load of the vehicle.

In any of the embodiments herein, where it is indicated that the control unit is configured to control a torque output of the at least one traction motor, this includes controlling (e.g., automatically controlling) a torque output of a single traction motor, and, in embodiments where a vehicle has plural traction motors, controlling respective torque outputs of the plural traction motors, or controlling a respective torque output of each of at least one of the plural traction motors.

In one aspect of the invention, the control unit is configured to control (e.g., automatically control) a torque output of the traction motor to hold zero speed or near zero speed of the vehicle on a grade without knowing information, in at least one mode of operation, about the grade and/or a load of the vehicle, and without application of a service brake of the vehicle.

In an embodiment, the control unit is configured to calculate a deceleration of the vehicle and control the torque output of the traction motor in dependence upon the calculated deceleration to hold the zero speed or near zero speed.

In an embodiment, the control unit is configured to actively manage the vehicle to a target deceleration to a selectable speed, without applying a service brake of the vehicle, by controlling the toque output of the traction motor.

In an embodiment, the control unit is configured to control (e.g., automatically control) the torque output of the traction motor to hold the zero speed or the near zero speed of the vehicle on the grade, without a service brake of the vehicle being activated.

In an embodiment, the drive system includes an engine, an alternator (e.g., three-phase AC generator/alternator) configured to be driven by the engine, a rectifier electrically coupled to the alternator, and one or more power converters electrically coupled to the rectifier. The one or more power converters are electrically coupled to the at least one traction motor. The at least one traction motor is configured to drive at least one wheel of the vehicle. The control unit is configured to electrically communicate a torque request signal to the one or more power converters to control the torque output of the at least one traction motor.

In an embodiment, the control unit is configured to control (e.g., automatically control) the torque output of the traction motor to hold the zero speed or the near zero speed of the vehicle on the grade at least partially responsive to at least one of an acceleration of the vehicle decreasing, or deactivation of an operator accelerator control of the vehicle.

In an embodiment, the control unit is configured to control (e.g., automatically control) the torque output of the traction motor to hold the zero speed or the near zero speed of the vehicle on the grade responsive to: in a first mode of operation, an acceleration of the vehicle decreasing below a first designated threshold; in a second mode of operation, deactivation of an operator accelerator control of the vehicle below a second designated threshold; and in a third mode of operation, actuation of the operator accelerator control from a first, deactivated state to a second, activated state that is insufficient in terms of causing acceleration of the vehicle to avoid vehicle rollback absent application of the service braking system and operation of the control unit to automatically control holding the vehicle at the zero speed or near zero speed.

In an embodiment, the control unit is configured to control (e.g., automatically control) the torque output of the traction motor to hold the zero speed or the near zero speed of the vehicle on the grade to prevent rollback of the vehicle.

In another embodiment, a method for controlling a vehicle comprises electrically powering a drive system of the vehicle for vehicle propulsion. The drive system includes at least one traction motor. The method further comprises, with a control unit of the vehicle, controlling (e.g., automatically controlling) a torque output of the at least one traction motor to hold zero speed or near zero speed of the vehicle on a grade without knowing information, in at least one mode of operation, about at least one of the grade or a load of the vehicle.

In another embodiment, a method for controlling a vehicle comprises electrically powering a drive system of the vehicle for vehicle propulsion. The drive system includes at least one traction motor. The method further comprises, with a control unit of the vehicle, controlling (e.g., automatically controlling) a torque output of the at least one traction motor to hold zero speed or near zero speed of the vehicle on a grade without knowing information, in at least one mode of operation, about at least one of the grade or a load of the vehicle. The vehicle includes at least one power converter for powering the at least one traction motor. The method further comprises electrically communicating, with the control unit, a torque request signal to the one or more power converters to control the torque output of the at least one traction motor.

In another embodiment, a method for controlling a vehicle comprises electrically powering a drive system of the vehicle for vehicle propulsion. The drive system includes at least one traction motor. The method further comprises, with a control unit of the vehicle, controlling (e.g., automatically controlling) a torque output of the at least one traction motor to hold zero speed or near zero speed of the vehicle on a grade without knowing information, in at least one mode of operation, about at least one of the grade or a load of the vehicle. The method further comprises, with the control unit, calculating a deceleration of the vehicle. The torque output of the at least one traction motor is controlled in dependence upon the deceleration that is calculated to hold the vehicle at the zero speed or near zero speed.

In another embodiment, a method for controlling a vehicle comprises electrically powering a drive system of the vehicle for vehicle propulsion. The drive system includes at least one traction motor. The method further comprises, with a control unit of the vehicle, controlling (e.g., automatically controlling) a torque output of the at least one traction motor to hold zero speed or near zero speed of the vehicle on a grade without knowing information, in at least one mode of operation, about at least one of the grade or a load of the vehicle. The method further comprises, with the control unit, actively managing the vehicle to a target deceleration to a selectable speed, without applying a service brake of the vehicle, by controlling the toque output of the at least one traction motor.

In another embodiment, a method for controlling a vehicle comprises electrically powering a drive system of the vehicle for vehicle propulsion. The drive system includes at least one traction motor. The method further comprises, with a control unit of the vehicle, controlling (e.g., automatically controlling) a torque output of the at least one traction motor to hold zero speed or near zero speed of the vehicle on a grade without knowing information, in at least one mode of operation, about at least one of the grade or a load of the vehicle. The torque output of the at least one traction motor is controlled to hold the zero speed or the near zero speed of the vehicle on the grade, without a service brake of the vehicle being activated.

In another embodiment, a system (e.g., a control system for a vehicle) comprises a control unit configured to be electrically coupled to a drive system of the vehicle. The drive system includes at least one traction motor for providing motive power to the vehicle. The control unit is configured to determine a calculated deceleration of the vehicle, and to control a torque output of at least one traction motor of the vehicle, based at least in part on the calculated deceleration, to a target deceleration of the vehicle to a selected speed, without applying a service brake of the vehicle.

In another embodiment, a method for controlling a vehicle on grade comprises determining, with a control unit on-board the vehicle, a calculated deceleration of the vehicle. The method further comprises, with the control unit, controlling (e.g., automatically controlling) a torque output of at least one traction motor of the vehicle, based at least in part on the calculated deceleration, to a target deceleration of the vehicle to a selected speed, without applying a service brake of the vehicle.

In an embodiment, the selected speed is a user-selected speed. In another embodiment, alternatively or additionally, the selected speed is one of a zero speed or a near zero speed. (For example, the control unit may be configured to receive an input signal of the selected speed from a user interface, the user interface being configured to only allow the user to select between the zero speed and the near zero speed.)

In another embodiment, a method for controlling a vehicle on grade comprises determining, with a control unit on-board the vehicle, a calculated deceleration of the vehicle. The method further comprises, with the control unit, controlling (e.g., automatically controlling) a torque output of at least one traction motor of the vehicle, based at least in part on the calculated deceleration, to a target deceleration of the vehicle to a selected speed, without applying a service brake of the vehicle. The steps of determining the calculated deceleration and controlling the torque output are performed without knowing information about at least one of vehicle load or grade.

In another embodiment, a method for controlling a vehicle on grade comprises determining, with a control unit on-board the vehicle, a calculated deceleration of the vehicle. The method further comprises, with the control unit, controlling (e.g., automatically controlling) a torque output of at least one traction motor of the vehicle, based at least in part on the calculated deceleration, to a target deceleration of the vehicle to a selected speed, without applying a service brake of the vehicle. The step of determining the calculated deceleration includes estimating a grade and a load of the vehicle.

Another embodiment relates to a vehicle. The vehicle includes an engine and a power system coupled to the engine. The power system is configured to convert mechanical power produced by the engine into electrical power for use by at least one traction motor of the vehicle. The vehicle also includes a control unit electrically coupled to the power system. The control unit is configured to control a torque output of the traction motor to hold zero speed or near zero speed of the vehicle on a grade without knowing information, in at least one mode of operation, about the grade and/or a load of the vehicle.

In an embodiment, the power system includes a three-phase AC generator coupled to the engine, a rectifier electrically coupled to the generator, and one or more power converters electrically coupled to the rectifier. The control unit is configured to control the one or more power converters for controlling the torque output to hold the zero speed or the near zero speed of the vehicle on the grade.

In an embodiment, the vehicle is a mine haul truck.

In an embodiment, the control unit is configured to control the torque output of the traction motor in dependence upon a calculated deceleration of the vehicle.

In an embodiment, the control unit is configured to actively manage to a target deceleration to a selectable speed by controlling the torque output of the traction motor, without applying a service brake of the vehicle.

In another embodiment, a vehicle comprises at least one traction motor, a power system configured to convert received electrical power to electrical signals for powering the at least one traction motor to move the vehicle, and a control unit electrically coupled to the power system. The control unit is configured to at least one of: electrically communicate a torque request signal to the power system to control a torque output of the at least one traction motor to hold zero speed or near zero speed of the vehicle on a grade without knowing information, in at least one mode of operation, about the grade and/or a load of the vehicle; and/or determine a calculated deceleration of the vehicle, and to electrically communicate the torque request signal to the power system to control the torque output of the at least one traction motor, based at least in part on the calculated deceleration, to a target deceleration of the vehicle to a selected speed, without applying a service brake of the vehicle.

Although embodiments have been illustrated with respect to vehicles having fuel engine-driven alternators and particular electrical systems, embodiments are also applicable to electric vehicles (with or without on-board energy storage devices), hybrid vehicles (e.g., fuel engine used to charge on-board energy storage device), etc.

Thus, in another embodiment of a vehicle, the vehicle includes a power system and at least one traction motor. The vehicle includes an on-board energy storage device (e.g., battery and/or ultra-capacitor), which stores electrical energy sufficient for powering the at least one traction motor for vehicle movement/traction. The power system is configured to convert power from the energy storage device to electrical signals for powering the at least one traction motor. The vehicle also includes a control unit electrically coupled to the power system. The control unit is configured to control a torque output of the traction motor to hold zero speed or near zero speed of the vehicle on a grade without knowing information, in at least one mode of operation, about the grade and/or a load of the vehicle. For example, the control unit may be configured to electrically communicate a torque request signal to the power system to control the torque output of the at least one traction motor. In other embodiments, the control unit may be additionally or alternatively configured as described elsewhere herein.

In another embodiment of a vehicle, the vehicle includes a power system and at least one traction motor. The vehicle includes a pantograph, electric trolley system, or other off-board power coupling device for selectively movably electrically connecting the vehicle to a catenary, third rail, or other off-board electrical conductor that is configured to provide electricity to the vehicle for movement/traction (and possibly other functions in addition). The power system is configured to convert power received from the off-board electrical conductor to electrical signals for powering the at least one traction motor. The vehicle also includes a control unit electrically coupled to the power system. The control unit is configured to control a torque output of the traction motor to hold zero speed or near zero speed of the vehicle on a grade without knowing information, in at least one mode of operation, about the grade and/or a load of the vehicle. For example, the control unit may be configured to electrically communicate a torque request signal to the power system to control the torque output of the at least one traction motor. In other embodiments, the control unit may be additionally or alternatively configured as described elsewhere herein.

In another embodiment of a vehicle, the vehicle includes a power system and at least one traction motor. The vehicle also includes an on-board energy storage device (e.g., battery and/or ultra-capacitor), which stores electrical energy sufficient for powering the at least one traction motor for vehicle movement/traction. The vehicle also includes a pantograph, electric trolley system, or other off-board power coupling device for selectively movably electrically connecting the vehicle to a catenary, third rail, or other off-board electrical conductor that is configured to provide electricity to the vehicle for movement/traction, and/or for charging the energy storage device, and/or possibly other functions in addition. The power system is configured to convert power received from the off-board electrical conductor and/or from the energy storage device to electrical signals for powering the at least one traction motor. The vehicle also includes a control unit electrically coupled to the power system. The control unit is configured to control a torque output of the traction motor to hold zero speed or near zero speed of the vehicle on a grade without knowing information, in at least one mode of operation, about the grade and/or a load of the vehicle. For example, the control unit may be configured to electrically communicate a torque request signal to the power system to control the torque output of the at least one traction motor. In other embodiments, the control unit may be additionally or alternatively configured as described elsewhere herein.

In another embodiment, a vehicle comprises at least one traction motor, at least one of an on-board energy storage device or an off-board power coupling device, and a power system configured to convert electrical power received from the at least one of the on-board energy storage device or the off-board power coupling device to electrical signals for powering the at least one traction motor to move the vehicle. The vehicle further comprises a control unit electrically coupled to the power system. The control unit is configured to at least one of: electrically communicate a torque request signal to the power system to control a torque output of the at least one traction motor to hold zero speed or near zero speed of the vehicle on a grade without knowing information, in at least one mode of operation, about the grade and/or a load of the vehicle; or determine a calculated deceleration of the vehicle, and to electrically communicate the torque request signal to the power system to control the torque output of the at least one traction motor, based at least in part on the calculated deceleration, to a target deceleration of the vehicle to a selected speed, without applying a service brake of the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. As used herein, the terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the system and method for controlling a vehicle, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A system comprising:
a control unit configured to be electrically coupled to a drive system of the vehicle, the drive system including at least one traction motor for providing motive power to the vehicle;
wherein the control unit is configured to control a torque output of the at least one traction motor to hold zero speed or near zero speed of the vehicle on a grade without knowing information, in at least one mode of operation, about at least one of the grade or a load of the vehicle;
and wherein the control unit is configured to calculate a deceleration of the vehicle and control the torque output of the at least one traction motor in dependence upon the deceleration that is calculated to hold the vehicle at the zero speed or near zero speed.

2. The system of claim 1, wherein the control unit is configured to automatically control the torque output of the at least one traction motor to hold the zero speed or the near zero speed of the vehicle on the grade, without a service brake of the vehicle being activated.

3. The system of claim 1, further comprising the drive system of the vehicle, the drive system including an engine, and the drive system being configured to convert power produced by the engine into electrical power for use by at least one traction motor.

4. The system of claim 2, wherein the control unit is configured to automatically control the torque output of the at least one traction motor to hold the zero speed or the near zero speed of the vehicle on the grade at least partially responsive to at least one of an acceleration of the vehicle decreasing, or deactivation of an operator accelerator control of the vehicle.

5. The system of claim 2, wherein the control unit is configured to automatically control the torque output of the at least one traction motor to hold the zero speed or the near zero speed of the vehicle on the grade to prevent rollback of the vehicle.

6. A vehicle comprising:
at least one wheel; and
the system of claim 3, wherein:
the drive system includes an alternator configured to be driven by the engine, a rectifier electrically coupled to the alternator, and one or more power converters electrically coupled to the rectifier;
the one or more power converters are electrically coupled to the at least one traction motor;
the at least one traction motor is configured to drive the at least one wheel; and the control unit is configured to electrically communicate a torque request signal to the one or more power converters to control the torque output of the at least one traction motor.

7. The system of claim 3, wherein the control unit is configured to automatically control the torque output of the at least one traction motor to hold the zero speed or the near zero speed of the vehicle on the grade, without a service brake of the vehicle being activated.

8. A system comprising:
a control unit configured to be electrically coupled to a drive system of the vehicle, the drive system including at least one traction motor for providing motive power to the vehicle;
wherein the control unit is configured to control a torque output of the at least one traction motor to hold zero speed or near zero speed of the vehicle on a grade without knowing information, in at least one mode of operation, about at least one of the grade or a load of the vehicle;
and the control unit is configured to actively manage the vehicle to a target deceleration to a selectable speed, without applying a service brake of the vehicle, by controlling the torque output of the at least one traction motor.

9. A system comprising:
a control unit configured to be electrically coupled to a drive system of the vehicle, the drive system including at least one traction motor for providing motive power to the vehicle;
wherein the control unit is configured to control a torque output of the at least one traction motor to hold zero speed or near zero speed of the vehicle on a grade without knowing information, in at least one mode of operation, about at least one of the grade or a load of the vehicle, and without a service brake of the vehicle being activated; and
wherein the control unit is configured to automatically control the torque output of the at least one traction motor to hold the zero speed or the near zero speed of the vehicle on the grade responsive to: in a first mode of operation, an acceleration of the vehicle decreasing below a first designated threshold; in a second mode of operation, deactivation of an operator accelerator control of the vehicle below a second designated threshold; and in a third mode of operation, actuation of the operator accelerator control from a first, deactivated state to a second, activated state that is insufficient in terms of causing acceleration of the vehicle to avoid vehicle rollback absent application of the service brake and operation of the control unit to automatically control holding the vehicle at the zero speed or near zero speed.

10. A method for controlling a vehicle, comprising:
electrically powering a drive system of the vehicle for vehicle propulsion, the drive system including at least one traction motor;
with a control unit of the vehicle, controlling a torque output of the at least one traction motor to hold zero speed or near zero speed of the vehicle on a grade without knowing information, in at least one mode of operation, about at least one of the grade or a load of the vehicle;
with the control unit, calculating a deceleration of the vehicle; and
wherein the torque output of the at least one traction motor is controlled in dependence upon the deceleration that is calculated to hold the vehicle at the zero speed or near zero speed.

11. The method of claim 10, wherein:
the vehicle includes at least one power converter for powering the at least one traction motor; and
the method further comprises electrically communicating, with the control unit, a torque request signal to the one or more power converters to control the torque output of the at least one traction motor.

12. The method of claim 10, further comprising:
with the control unit, actively managing the vehicle to a target deceleration to a selectable speed, without applying a service brake of the vehicle, by controlling the torque output of the at least one traction motor.

13. The method of claim 10, wherein the torque output of the at least one traction motor is controlled to hold the zero speed or the near zero speed of the vehicle on the grade, without a service brake of the vehicle being activated.

14. A method for controlling a vehicle on grade, comprising:
determining, with a control unit on-board the vehicle, a calculated deceleration of the vehicle; and
with the control unit, controlling a torque output of at least one traction motor of the vehicle, based at least in part on the calculated deceleration, to a target deceleration of the vehicle to a selected speed, without applying a service brake of the vehicle.

15. The method of claim 14, wherein:
the selected speed is one of a zero speed or a near zero speed.

16. The method of claim 14, wherein:
the steps of determining the calculated deceleration and controlling the torque output are performed without knowing information about at least one of vehicle load or grade.

17. The method of claim 14, wherein:
the step of determining the calculated deceleration includes estimating a grade and a load of the vehicle.

18. A vehicle comprising:
at least one traction motor;
a power system configured to convert received electrical power to electrical signals for powering the at least one traction motor to move the vehicle; and
a control unit electrically coupled to the power system, wherein the control unit is configured to electrically communicate a torque request signal to the power system to control a torque output of the at least one traction motor to hold zero speed or near zero speed of the vehicle on a grade without knowing information, in at least one mode of operation, about the grade and/or a load of the vehicle; and determine a calculated deceleration of the vehicle, and to electrically communicate the torque request signal to the power system to control the torque output of the at least one traction motor, based at least in part on the calculated deceleration, to a target deceleration of the vehicle to a selected speed, without applying a service brake of the vehicle.

19. The vehicle of claim 18, further comprising at least one of an on-board energy storage device or an off-board power coupling device, the at least one of the on-board energy storage device or the off-board power coupling device configured to provide the electrical power, wherein the power system is configured to convert the electrical power received from the at least one of the on-board energy storage device or the off-board power coupling device to the electrical signal for powering the at least traction motor to move the vehicle.

* * * * *